(12) United States Patent
Jandard et al.

(10) Patent No.: US 11,450,222 B2
(45) Date of Patent: *Sep. 20, 2022

(54) SYSTEM AND METHOD FOR SHARING CONTENT

(71) Applicant: D2L Corporation, Kitchener (CA)

(72) Inventors: Chantal Jandard, Kitchener (CA); Matthew Campbell, Kitchener (CA); Dana Marr, Kitchener (CA); Rylan Cottrell, Kitchener (CA); Joseph Wong, Kitchener (CA); Claudia Peralta, Kitchener (CA); Josh Cheung, Kitchener (CA)

(73) Assignee: D2L Corporation, Kitchener (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,447

(22) Filed: Mar. 8, 2021

(65) Prior Publication Data

US 2021/0264803 A1 Aug. 26, 2021

Related U.S. Application Data

(63) Continuation of application No. 16/853,385, filed on Apr. 20, 2020, now Pat. No. 10,964,223, which is a continuation of application No. 14/629,098, filed on Feb. 23, 2015, now Pat. No. 10,657,835.

(51) Int. Cl.
  *G09B 5/08* (2006.01)
  *G09B 5/06* (2006.01)
  *G09B 7/02* (2006.01)

(52) U.S. Cl.
  CPC .............. *G09B 5/08* (2013.01); *G09B 5/06* (2013.01); *G09B 7/02* (2013.01)

(58) Field of Classification Search
  CPC .............. G09B 5/06; G09B 5/08; G09B 7/02
  See application file for complete search history.

(56) References Cited

U.S. PATENT DOCUMENTS

| | | |
|---|---|---|
| 7,413,442 B2 | 8/2008 | Okunishi et al. |
| 2005/0136388 A1 | 6/2005 | de Saint-Aignan et al. |
| 2006/0223040 A1 | 10/2006 | Brown |
| 2006/0234732 A1 | 10/2006 | Kim |
| 2010/0028846 A1 | 2/2010 | Cohen et al. |
| 2010/0235395 A1 | 9/2010 | Cepuran et al. |
| 2011/0086330 A1 | 4/2011 | Mounia |
| 2011/0207108 A1 | 8/2011 | Dorman |
| 2011/0223576 A1 | 9/2011 | Foster et al. |
| 2011/0244440 A1 | 10/2011 | Saxon et al. |
| 2012/0077174 A1 | 3/2012 | DePaul |
| 2012/0077176 A1 | 3/2012 | Foster et al. |
| 2013/0095460 A1 | 4/2013 | Bishop |
| 2014/0075545 A1 | 3/2014 | Winneg et al. |

OTHER PUBLICATIONS

Steinke, Gerhard, A task-based approach to implementing computer security, The Journal Computer Information Systems, Fall 1997.

*Primary Examiner* — Eddy Saint-Vil
(74) *Attorney, Agent, or Firm* — Bereskin & Parr LLP/S.E.N.C.R.L., s.r.l.

(57) ABSTRACT

A method for completing a project using a content-generating device. The method includes receiving a task defining a content item to be generated, restricting operation of at least a first component of the content-generating device, operating at least a second component of the content-generating device to generate the content item, and making available the generated content item.

13 Claims, 13 Drawing Sheets

SYSTEM AND METHOD FOR SHARING CONTENT

CROSS-REFERENCE TO RELATED APPLICATIONS

The application is a continuation of U.S. patent application Ser. No. 16/853,385 filed on Apr. 20, 2020 which is a continuation of U.S. patent application Ser. No. 14/629,098 filed on Feb. 23, 2015. The entire content of each of U.S. patent application Ser. No. 16/853,385 and U.S. patent application Ser. No. 14/629,098 is hereby incorporated by reference.

FIELD

Various embodiments are described herein that generally relate to systems and methods for generating type-specific content and sharing that content among multiple users.

INTRODUCTION

Recently, there has been an increase in the use of electronic devices for instructional purposes. Use of electronic devices allows an instructor to engage students in ways that were not previously available to traditional instructional methods, such as paper-based methods. Use of electronic devices also allows for improved sharing of information.

DRAWINGS

For a better understanding of the various embodiments described herein, and to show more clearly how these various embodiments may be carried into effect, reference will be made, by way of example, to the accompanying drawings which show at least one example embodiment, and in which.

DESCRIPTION OF VARIOUS EMBODIMENTS

Figure 1:
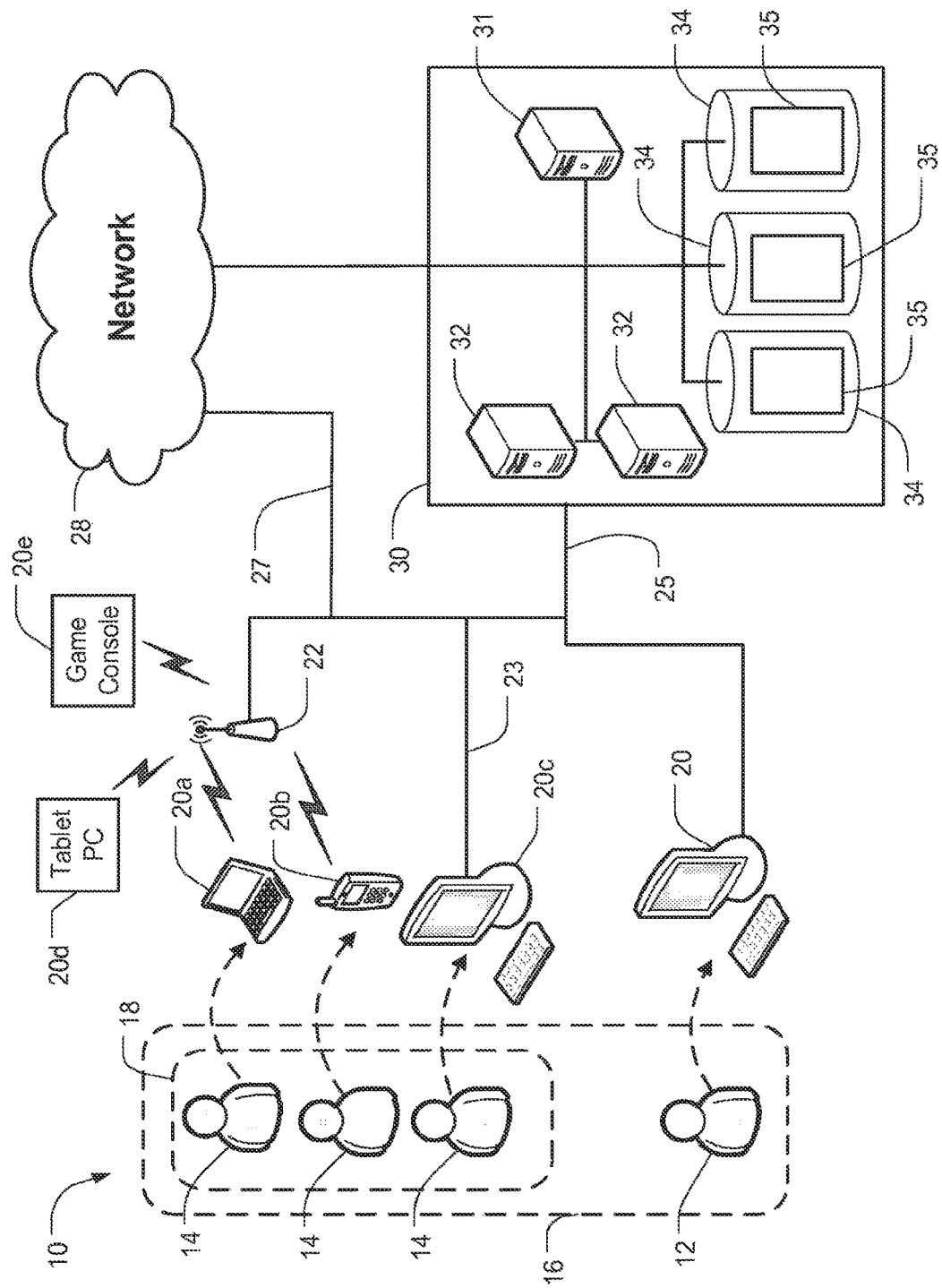
FIG. 1 is a block diagram illustrating an example embodiment of an educational system for providing electronic learning.

Various apparatuses or processes will be described below to provide an example of an embodiment of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses or processes described below. It is possible that an apparatus or process described below is not an embodiment of any claimed embodiment. Any embodiment disclosed in an apparatus or process described below that is not claimed in this document may be the subject matter of another protective instrument, for example, a continuing patent application, and the applicants, inventors or owners do not intend to abandon, disclaim or dedicate to the public any such embodiment by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

The various embodiments of the systems and methods described herein may be implemented in hardware or software, or a combination of both. For example, some embodiments may be implemented in computer systems and computer programs, which 10 may be stored on a physical computer readable medium, executable on programmable computers (e.g. computing devices and/or processing devices) each comprising at least one processor, a data storage system (including volatile and non-volatile memory and/or storage elements), at least one input device (e.g. a keyboard, mouse or touchscreen), and at least one output device (e.g. a display screen, a network, or a remote server). For example, and without limitation, the programmable computers may include servers, personal computers, laptops, tablets, personal data assistants (PDA), cell phones, smart phones, gaming devices, and other mobile devices. Program code can be applied to input data to perform the functions described herein and to generate output information. The output information can then be supplied to one or more output devices for outputting to one or more users.

The embodiments described herein generally relate to systems and methods for generating content and sharing that content among multiple users.

"Content item" herein refers to any electronic information that may be generated by a computing device. The electronic information may be transmitted over a network so as to be distributed amongst one or more devices acting as users or clients. A content item may be defined by its type. For example, the type of a content item may be text data, video data, image data, sound data or a combination thereof.

"Content-generating computing device" herein refers to any electronic information operable to generate (e.g. create) a content item, For example, the content-generating computing device may have at least one user input unit allowing a human user to interact with it so as to generate a content item. The content-generating computing device may also have at least one capture unit for capturing a signal of an environment surrounding the content item. The capture unit may be a camera, microphone, accelerometer, or GPS unit. For example, the contact-generating device may be a cell phone, smart phone, tablet, gaming device, personal computer, laptop, personal data assistant or other mobile device.

"Content item playback" herein refers to presenting a content item on a computing device in such a way that the content item may be experience by a user. The presentation of the content item during playback may vary depending on the type of the content item. For example, sound files may be played back using a speaker. For example, GPS data may be represented graphically on a visual map "Association of data entries" herein refers to a link, such as a logical link, among at least two pieces of electronic information, such as data entries, so that accessing a first of the pieces of electronic information allows for finding and accessing the other pieces of electronic information associated to that first piece of electronic information.

While the various embodiments of the system described herein are from the perspective of an electronic educational learning system, it should be understood that the techniques to generate content items and perform certain actions based on generated content items can be performed by other electronic systems including those used by corporations, organizations or individuals.

Referring now to FIG. 1, shown therein an example embodiment of an educational system 10 for providing electronic learning. One or more users 12 and 14 can use the educational system 10 to communicate with an educational service provider 30 to participate in, create, and consume electronic learning services, including various educational courses. In some cases, the educational service provider 30 may be part of or associated with a traditional "bricks and mortar" educational institution (e.g. an elementary school, a high school, a university or a college), another entity that provides educational services (e.g. an online university, a company that specializes in offering training courses, or an organization that has a training department), or may be an independent service provider (e.g. for providing individual electronic learning). Therefore, it should be understood that a course is not limited to formal courses offered by formal educational institutions. The course may include any form of learning instruction offered by an entity of any type. For example, the course may be a training seminar at a company for a small group of employees or a professional certification program with a larger number of intended participants (e.g. PMP, CMA, etc.).

In some embodiments, one or more educational groups can be defined that involve one or more of the users 12 and 14. For example, as shown in FIG. 1, the users 12 and 14 may be grouped together in an educational group 16 representative of a particular course (e.g. History 101, French 254), in which the user 12 is an "instructor" and is responsible for providing the course (e.g. organizing lectures, preparing assignments, creating educational content, etc.), while the other users 14 are "learners" that consume the course content, e.g. the users 14 are enrolled in the course to learn the course content. User 14 being "learners" may be referred herein as "non-instructor users 14".

In some cases, the users 12 and 14 may be associated with more than one educational group. For instance, the users 14 may be enrolled in more than one course and the user 12 may be enrolled in at least one course and may be responsible for teaching at least one other course or the user 12 may be responsible for teaching more than one course.

In some cases, educational sub-groups may also be formed. For example, two of the users 14 are shown as part of an educational sub-group 18. The sub-group 18 may be formed in relation to a particular project or assignment (e.g. sub-group 18 may be a lab group) or based on other criteria. In some cases, due to the nature of the electronic learning, the users 14 in a particular sub-group 18 need not physically meet, but may collaborate together using various tools provided by the educational service provider 30.

In some cases, the groups 16 and sub-groups 18 could include users 12 and 14 that share common interests (e.g. interests in a particular sport), that participate in common activities (e.g. users that are members of a choir or a club), and/or have similar attributes (e.g. users that are male, users under twenty-one years of age, etc.).

Communication between the users 12 and 14 and the educational service provider 30 can occur either directly or indirectly using any suitable computing device. For example, the user 12 may use a computing device 20 such as a desktop computer that has at least one input device (e.g. a keyboard and a mouse) and at least one output device (e.g. a display screen and speakers).

The computing device 20 can generally be any suitable device for facilitating communication between the users 12 and 14 and the educational service provider 30. For example, the computing device 20 could be a laptop 20a wirelessly coupled to an access point 22 (e.g. a wireless router, a cellular communications tower, etc.), a wirelessly enabled personal data assistant (PDA) 20b or smart phone, a terminal 20c over a wired connection 23 or a tablet computer 20d or a game console 20e over a wireless connection.

The computing devices 20 may be connected to the service provider 30 via any suitable communications channel. For example, the computing devices 20 may communicate to the educational service provider 30 over a local area network (LAN) or intranet, or using an external network, such as, for example, by using a browser on the computing device 20 to browse one or more web pages presented over the Internet 28 over a data connection 27.

The wireless access points 22 may connect to the educational service provider 30 through a data connection 25 established over the LAN or intranet. Alternatively, the wireless access points 22 may be in communication with the educational service provider 30 via the Internet 28 or another external data communications network. For example, one user 14 may use a laptop 20a to browse to a webpage that displays elements of an electronic learning system (e.g. a course page).

In some cases, one or more of the users 12 and 14 may be required to authenticate their identities in order to communicate with the educational service provider 30. For example, the users 12 and 14 may be required to input a login name and/or a password or otherwise identify themselves to gain access to the educational system 10.

In other cases, one or more users (e.g. "guest" users) may be able to access the educational system 10 without authentication. Such guest users may be provided with limited access, such as the ability to review only one or a few components of the course, for example, to decide whether they would like to participate in the course.

The educational service provider 30 generally includes a number of functional components for facilitating the provision of social electronic learning services. For example, the educational service provider 30 generally includes one or more processing devices 32 (e.g. servers), each having one or more processors. The processing devices 32 are configured to send information (e.g. HTML or other data) to be displayed on one or more computing devices 20, 20a, 20b and/or 20c in association with social electronic learning (e.g. course information). In some cases, the processing device 32 may be a computing device 20 (e.g. a laptop or a personal computer).

The educational service provider 30 also generally includes one or more data storage devices 34 (e.g. memory, etc.) that are in communication with the processing devices 32, and could include a relational database (such as an SQL database), or other suitable data storage devices. The data storage devices 34 are configured to host data 35 about the courses offered by the service provider. For example, the data 35 can include course frameworks, educational materials to be consumed by the users 14, records of assessments of users 14, assignments done by the users 14, as well as various other databases and the like.

The data storage devices 34 may also store authorization criteria that define which actions may be taken by the users 12 and 14. In some cases, the authorization criteria may include at least one security profile associated with at least one role. For example, one role could be defined for users who are primarily responsible for developing an educational course, teaching it, and assessing work product from students of the course. Users with such a role may have a security profile that allows them to configure various components of the course, to post assignments, to add assessments, to evaluate performance, and so on.

In some cases, some of the authorization criteria may be defined by specific users 40 who may or may not be part of the educational community 16. For example, users 40 may be permitted to administer and/or define global configuration profiles for the educational system 10, define roles within the educational system 10, set security profiles associated with the roles, and assign roles to particular users 12 and 14 who use the educational system 10. In some cases, the users 40 may use another computing device (e.g. a desktop computer 42) to accomplish these tasks.

The data storage devices 34 may also be configured to store other information, such as personal information about the users 12 and 14 of the educational system 10, information about which courses the users 14 are enrolled in, roles to which the users 12 and 14 are assigned, particular interests of the users 12 and 14 and the like.

The processing devices 32 and data storage devices 34 may also provide other electronic learning management tools (e.g. allowing users to add and drop courses, communicate with other users using chat software, etc.), and/or may be in communication with one or more other vendors that provide the tools. The processing devices 32 can also be configured to generate context specific terms and perform various functions related to the context specific terms and the data 35 can include collections of expected terms as well as context specific terms, as will be described in more detail with regards to FIGS. 2 to 8.

In some cases, the educational system 10 may also have one or more backup servers 31 that may duplicate some or all of the data 35 stored on the data storage devices 34. The backup servers 31 may be desirable for disaster recovery to prevent undesired data loss in the event of an electrical outage, fire, flood or theft, for example.

In some cases, the backup servers 31 may be directly connected to the educational service provider 30 but located within the educational system 10 at a different physical location. For example, the backup servers 31 could be located at a remote storage location that is some distance away from the service provider 30, and the service provider 30 could connect to the backup server 31 using a secure communications protocol to ensure that the confidentiality of the data 35 is maintained.

Figure 2:
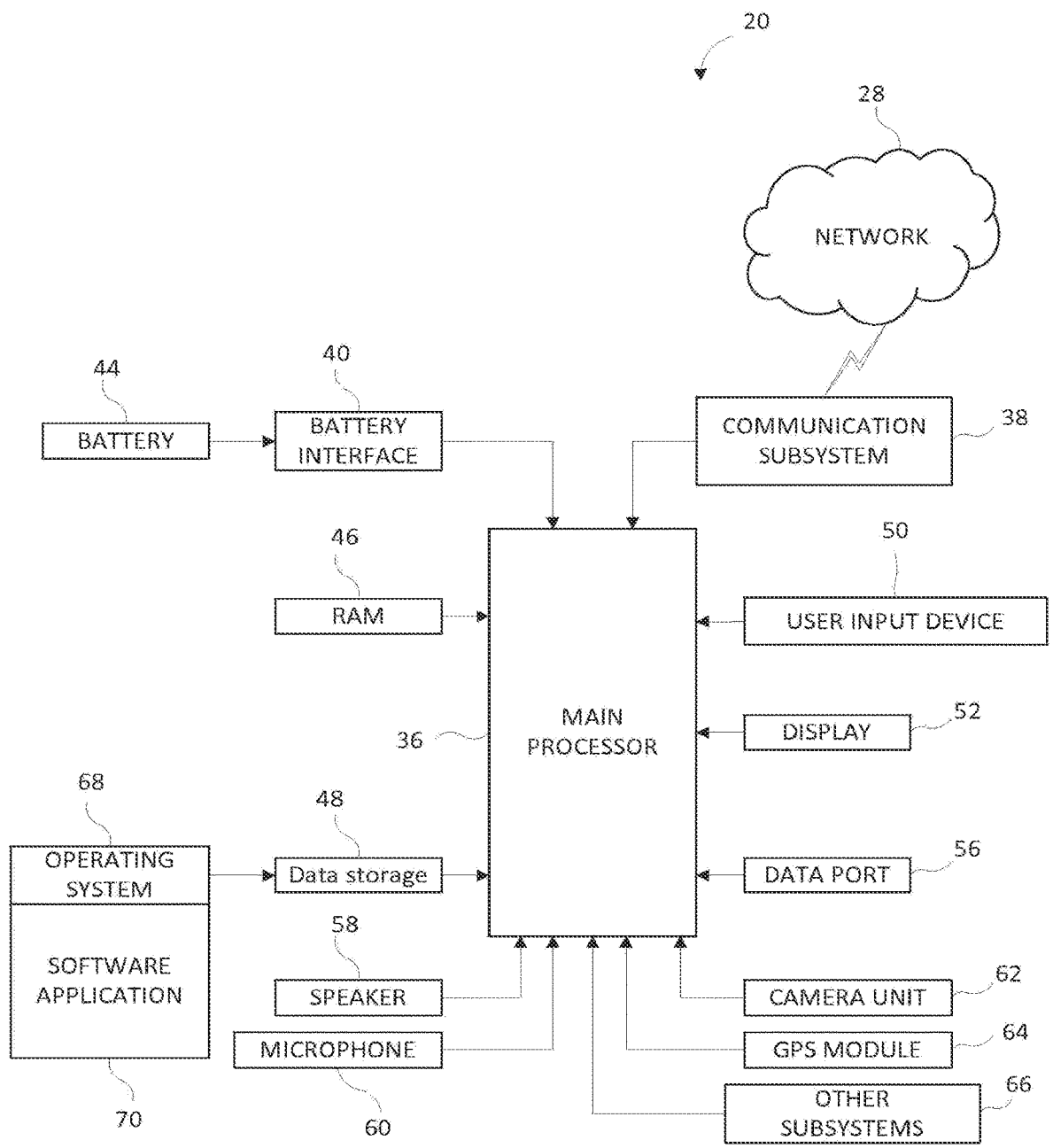
FIG. 2 is a block diagram illustrating an example embodiment of a computing system for a user to access the educational service provider.

Referring now to FIG. 2, therein illustrated is a simplified block diagram of components of a content-generating computing device 20 according to one exemplary embodiment. The exemplary embodiment content-generating computing device 20 may be used by a user 12 to generate one or more content items. As shown, the computing device 20 includes multiple components, including for example a processor 36 that controls the operations of the computing device 20. Communication functions, including data communications, voice communications, or both may be performed through a communication subsystem 38.

The computing device 20 may be portable and may be a battery-powered device and as shown may include a battery interface 40 for receiving one or more batteries 44.

The processor 36 generally interacts with subsystem components such as a Random Access Memory (RAM) 46, a data storage device 48 (e.g. flash memory or hard drive), a user input device 50 and a display 52 (which may be a touch-sensitive display that can also be operated as the user input device 50). Information, such as text, characters, symbols, images, icons, and other items may be displayed on the display 52. The user input device 50 and the display 52 can be used by the non-instructor user 14 to generate content items.

In some embodiments, user-interaction with the graphical user interface may be performed through touch sensitive display 52. In particular, the processor 36 may interact with the touch-sensitive display 52.

Other components could include one or more data ports 56, one or more speakers 58, a microphone 60, a camera unit 62, a GPS module 64 and other device subsystems 66.

The portable electronic device 100 also generally includes an operating system 68 and software components 70 that are executed by the processor 36. The operating system 68 and software components 70 may be stored in a persistent store such as the data storage device 48.

Figure 3:
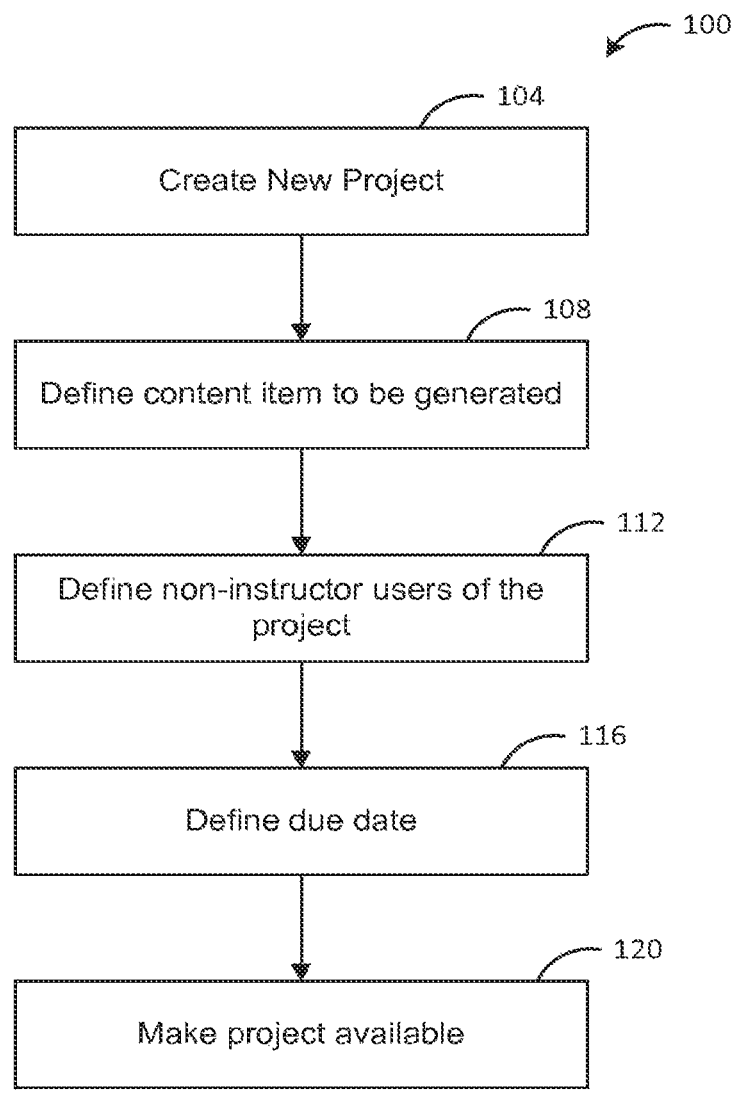
FIG. 3 is a flow chart diagram illustrating an example embodiment of a method for the creation of a content generation project.

Referring now to FIG. 3, shown therein is a flow chart diagram illustrating an example embodiment of a method 100 for the creation of a content generation project. The method 100 may be performed by the processor 36 of a computing device 20 being used by an instructor user 12 or by the processing device 32 of the educational service provider 30. In some exemplary embodiments, steps of the method 100 may be split between the processor 36 of the computing device 20 and the processing device 32 of the 30 educational service provider 30.

The term "content generation project" herein refers to an educational project in which at least one instructor user 12 and a plurality of non-instructor users 14 are participants. The participating non-instructor users 14 generate content items within the project which are made available to the at least one instructor user 12. The at least one instructor user 12 can then take an action in response to any generated content items. Generated content items may further be shared amongst the participating non-instructor users 14, as described elsewhere herein. The content generation project may be hosted by the educational service provider 30 in that information and data related to the project are stored on the data storage device 34 and may be treated by the processing device 32. The project may further be accessed (e.g. for project management or to complete a project task) by the instructor user 12 and non-instructor users 14 according to the access permissions provided to the different users.

At step 104, a new content generation project is created. The new content generation project may be created in response to an input from the instructor user 12 for requesting the creation of a new content generation project. In various example embodiments, a new content generation project can only be created where the creation request is received from an instructor user 12. The instructor user 12 may be created by inputting commands via a project creation environment. This environment may be displayed on the display device 52 of a computing device 20 being used by the instructor user 12. The environment may include a plurality of displayed elements which the instructor user 12 may interact with in order to input various commands, including the command for creating a new content generation project. The project creation environment may be implemented in hardware or software on the computing device 20 and/or the processing devices 32 of the educational service provider 30 and may be accessed by the instructor user 12 upon inputting of appropriate login information associated to the instructor user 12, such as a user identifier associated to the instructor user 12. Alternatively, the project creation environment may be implemented in hardware or software by the educational service provider 30, which sends information to display the project creation environment in response to the instructor user 12 inputting appropriate login information and requesting to access the project creation environment.

Figure 7:
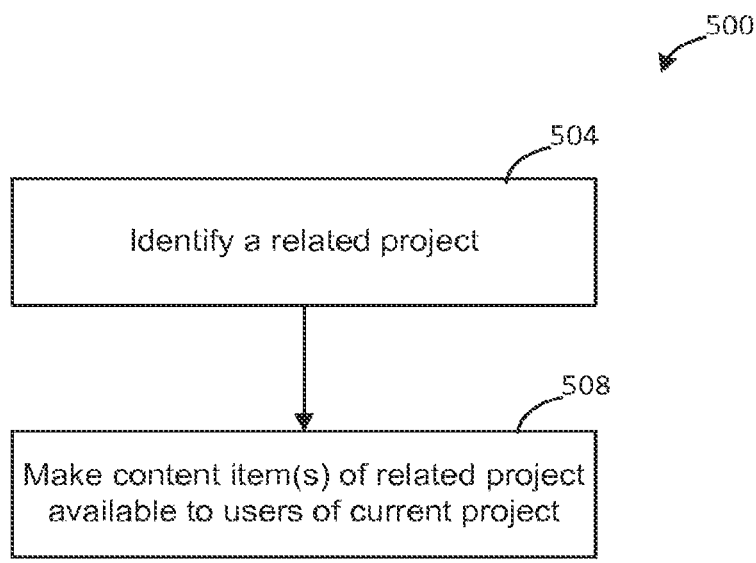
FIG. 7 is a flow chart diagram illustrating an example embodiment of a method for making available generated content.
Figure 8:
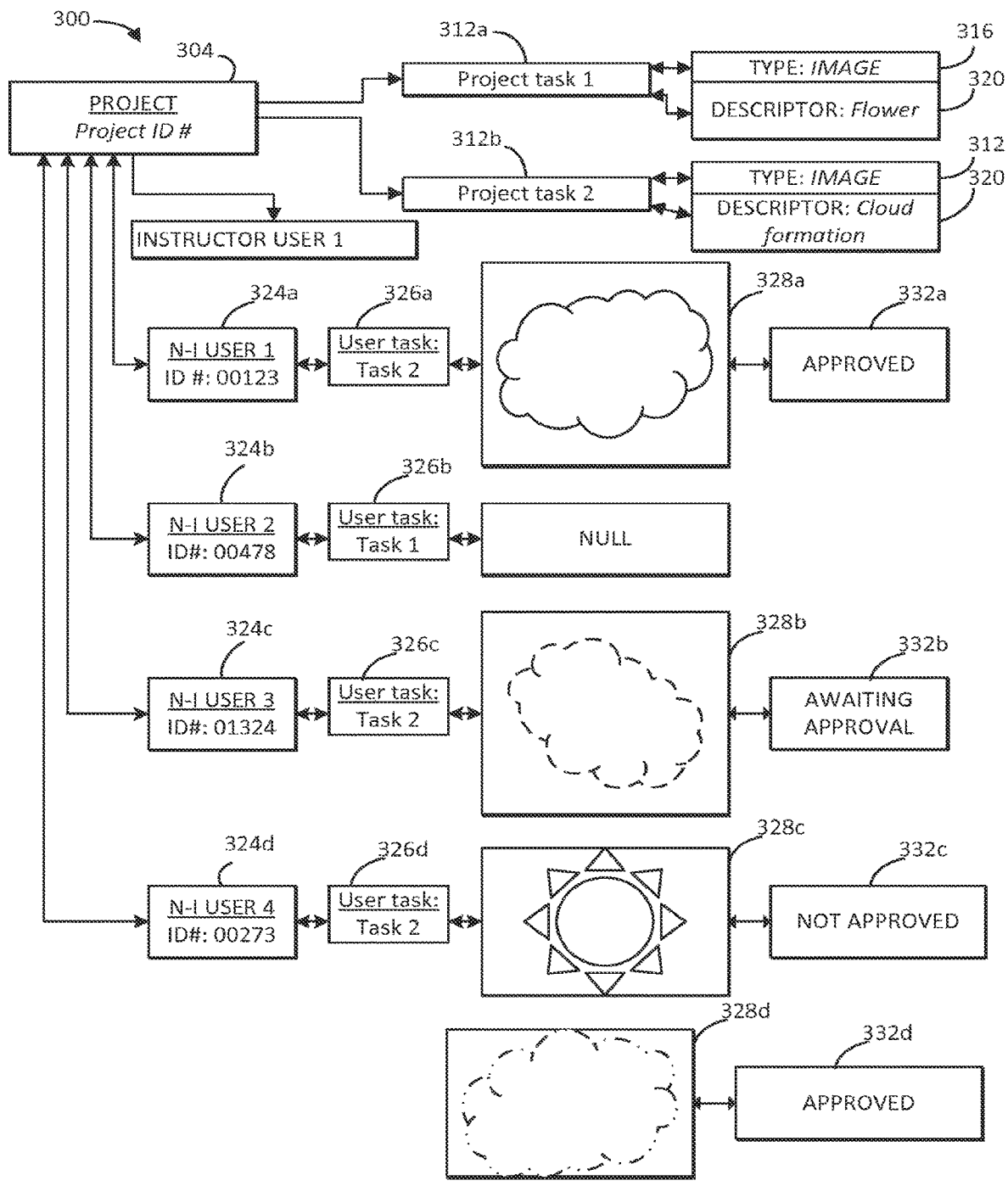
FIG. 8 is a block diagram illustrating an example embodiment of a method for collecting documents based on context specific terms.

Referring now to FIG. 7, shown therein is an exemplary data structure of a content generation project 300 showing association of various data entries. It will be understood that the data structure for a content generation project 300 may differ in other embodiments as long as associations of data entries described herein are maintained.

The new content generation project may be created as a data entry 304 that is stored within the data storage device 34 of the educational service provider 30. The data entry includes a project identifier field for identifying the newly created content generation project. The content generation project data entry may be further associated to an instructor data entry 308 that includes a user identifier field for identifying the instructor user 12 that submitted the request for creating the content generation project.

Referring back to FIG. 3, at step 108, at least one project task of generating a content item within the context of the new content generation project is defined. The at least one content item may be defined in response to at least one input and/or selection from the instructor user 12 within the project creation environment. Additionally, the content type (e.g. text, video, image, sound, etc.) of each of the at least one defined project tasks may be further defined. A description of each of the at least one defined content item may also be defined. The content type and/or the description for each of the at least one defined project task may also be specified within the at least one input and/or selection from the instructor user 12.

Referring again to FIG. 8, a data entry may be stored for each of the defined project task. For example, and as illustrated, where two to-be-generated content items are defined at step 108, the generation project 300 includes a first project task data entry 312a and a second project task data entry 312b, each corresponding to one of the defined tasks for generating content item. Each of the project task data entries 312a, 312b is further associated to the project identifier data entry 304. Each of the project task data entries 312a, 312b further indicates the content type 316 and a descriptor 320 of that to-be-generated content item. The content type 316 and descriptor 320 may be indicated within additional data entries stored on the data storage device 34 of the educational service provider 30.

Referring back to FIG. 3, at step 112, at least one non-instructor user 14 that is to participate within the newly created content generation project is defined. The at least one non-instructor user 14 may be defined in response to at least one input and/or selection from the instructor user 12 within the project creation environment. For example, a plurality of non-instructor user 14 may be defined as being participants of the content generation project by selecting an educational group 16 or educational sub-group 18, whereby each of the non-instructor users 18 belonging to that educational group 16 or educational sub-group 18 are defined as participants of the newly created content generation project.

Step 112 also includes assigning at least one of the project tasks defined at step 108 to each of the one or more of the defined participant non-instructor users 14. Assigning a project task to a participant non-instructor user 14 corresponds to defining a content generation task that that user 14 is to complete within the content generation project.

Referring again to FIG. 8, a data entry may be stored for each of the non-instructor user 14 defined at step 112. For example, and as illustrated, four non-instructor user data entries 324a, 324b, 324c, and 324d are stored and are each associated to the project identifier 304. Each non-instructor user data entry 324a, 324b, 324c and 324d includes a user identifier number that identifies one of the non-instructor users 14 participating in the content generation project. A non-instructor user data entry may be further associated with a user task data entry 326. The user task data entry 326 indicates a project task assigned to that user 14 at step 112 and represents the content generation task that that user 14 is to complete within the content generation project. For example, by identifying the project task indicated by the user task data entry, the appropriate project task data entry 312a, 312b can be retrieved. Additionally, properties of the content item to be generated as part of the project can also be determined, such as type from type data entry 316 and description from description data entry 320.

Referring back to FIG. 3, at step 116, a due date for the newly created content generation project may be defined. The due data may be defined in response to at least one input and/or selection from the instructor user 12 within the project creation environment.

The due date may be created as a further due data entry that is stored within the data storage device 34 and associated with the project identifier data entry 304.

At step 120, the newly created content generation project is made available to the instructor user 12 and the non-instructor users 14 that are defined as participants of the creation.

"Make available" as used herein can refer to a pull communication, a push communication or both. For example, information stored at the data storage device 34 is made available to a user device in that the user device can request the information and subsequently download (e.g. pull) that information. Conversely, and for example, information stored at the data storage device 34 is made available to a user device in that a server initiates a request with the user device so as to cause the user device to download that information.

According to one exemplary embodiment, when the newly created content generation project is made available, at least a portion of the data entries stored within the data storage device 34 and corresponding to that project may be made accessible to users participating in the project. For example, users 12, 14 may access the made available content generation project by providing their user identifier and logging in to the educational service provider 30 using a computing device 20. A user may then access using the computing device 20 information related to the project.

In some example embodiments, the information accessible to a user may depend on the credentials given to that user. For example, an instructor user 12 may be able to access all of the information pertaining to the project, such as being able to view each of the data entries and their content created for the project. Conversely, a non-instructor user 14 may be able to access only a portion of the information pertaining to the project. For example, a non-instructor user 14 may only view the contents of the project identifier data entry 304, the contents of one or more project task data entries 326 associated to the non-instructor user data entry 324a, 324b, 324c or 324d of that user, and the properties of the to-be-generated content item indicated by the one or more user task data entries 326. Other information may also be available to different users, as described elsewhere herein.

Figure 4:
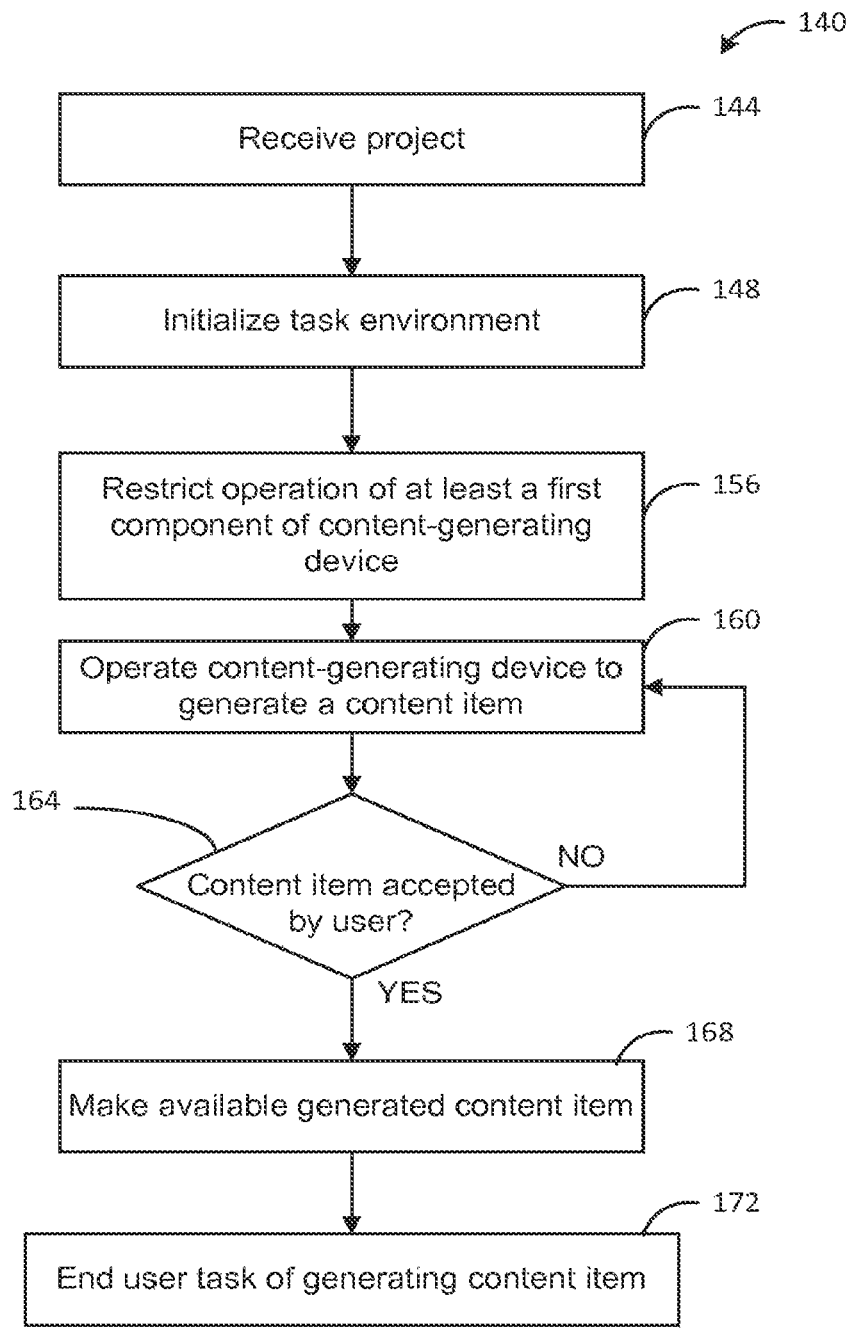
FIG. 4 is a flow chart diagram illustrating an example embodiment of a method for the carrying out of a project task of generating a content item.

Referring now to FIG. 4, shown therein is a flow chart diagram illustrating an example embodiment of a method 140 for the carrying out of a project task of generating a content item. The method 140 may be performed by the processor 36 of a content-generating computing device 20 being used by a non-instructor user 14. The method 140 may include controlling various components of the content-generating computing device 20.

At step 144, information pertaining to a content generation project is received. The received content generation project corresponds to a project that was created by the instructor user 12 and made available at step 120 to one or more non-instructor users 14 defined as participants of the project. As described herein, a non-instructor user 14 may login to the educational system 10. Then by providing a user identifier for that user 12 using a computing device 20, information relating to a project associated to that user identifier may be downloaded to the computing device 20. For example, the user identifier is provided to the processing devices 32 of the educational service provider 30 and the information relating to the project associated to that user identifier is downloaded to the computing device 20 from the data storage device 34 of the educational service provider 30.

Receiving information relating to the project may include accessing the user task data entries 326a, 326b, 326c, and 326d associated to the non-instructor user data entry stored in the data storage device 34. The project task data entries 312a, 312b indicated by the user task data entries 326 may also be accessed. Furthermore, properties of the to-be-generated content item defined by the project task data entry being stored in the content item type data entry 316 and the description data entry 320 associated to the to-be-generated content item data entries may also be accessed.

The received information relating to the project may be displayed within a task selection environment displayed on the display 52 of the computing device 20 used by the given non-instructor user 14. In one exemplary embodiment, the task selection environment may display information pertaining to each of the project tasks assigned to the given non-instructor user 14. This information may include the type and descriptor of each of the to-be-generated content items as indicated in the project task data entries 326 associated to the given user. The task selection environment may be implemented in hardware or software on the processor 36 of computing device 20 and/or the processing devices 32 of the educational service provider 30.

Figure 9:
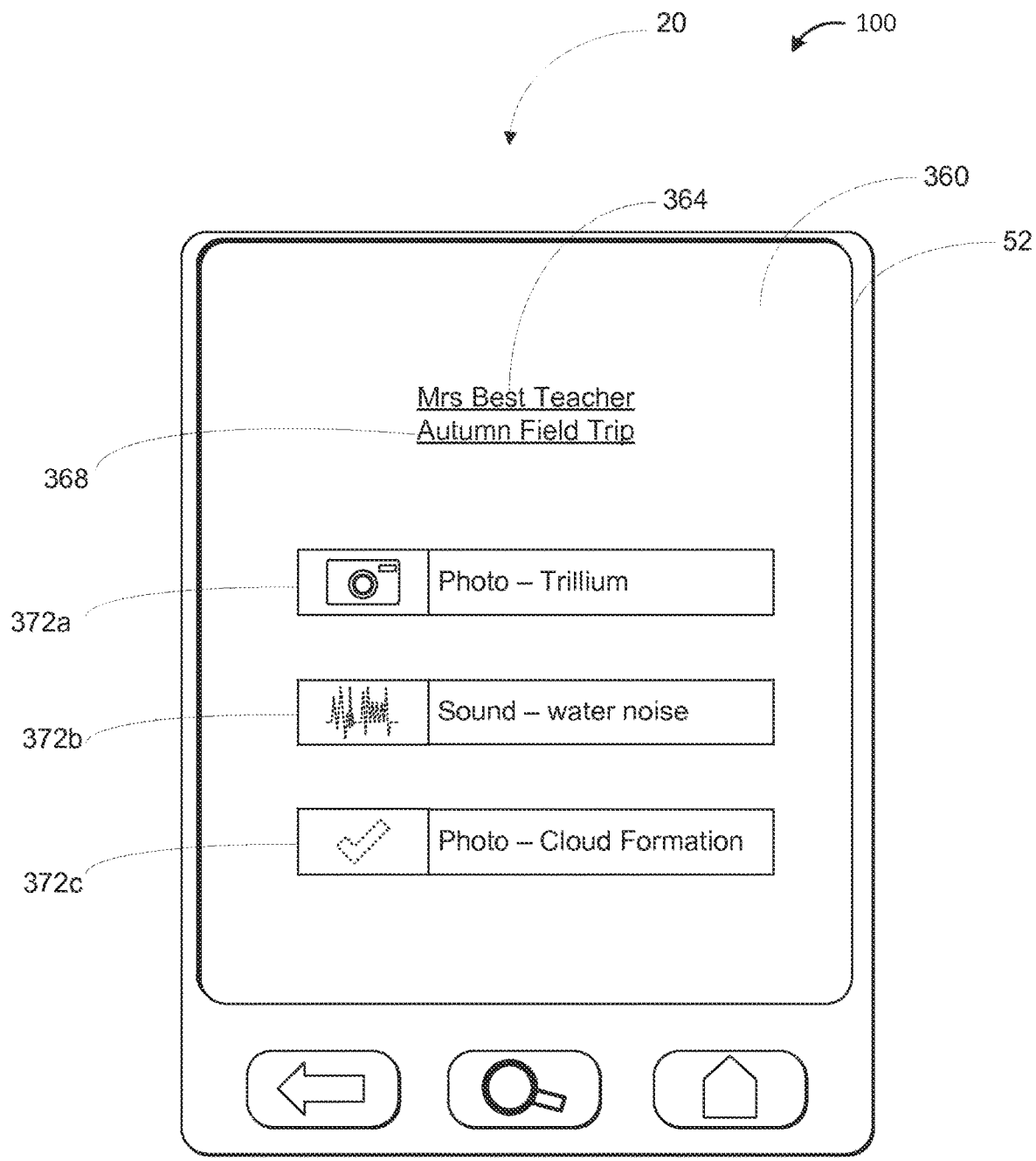
FIG. 9 is a block diagram illustrating an example task selecting environment.

Referring now to FIG. 9, therein illustrated is a block diagram of an exemplary task selection environment 360 displayed on the display 52 of a content-generating computing device 20 that may be used by a non-instructor user 14. The task selection environment 360 includes a displayed instructor descriptor 364, which displays a description of the user instructor 12 associated to the project. The task selection environment 360 further includes a displayed project descriptor 368, which displays a description of the current project. The task selection environment 360 further includes one or more user task descriptors 372a, 372b, and 372c. Each project task descriptor includes a status descriptor 376a, 376b, 376c, a content item type field 380a, 380b, 380c and a content item descriptor 384a, 384b, and 384c. Each project task descriptor corresponds to a user task associated to the non-instructor user 14 within the current project. The type field and content item descriptor are based on the type data entry and descriptor entry associated to the project task indicated by the user task. A non-instructor user 14 using the computer device 20 may select one of the user task descriptors to initiate a task.

Referring back to FIG. 4, at step 148, a user task is initiated. For example, information relating to a project may be stored on the computing device 20 after being received at 144. The user may then interact with the computing device 20 so as to initiate a user task so as to begin carrying out that user task. For example, the user may make a selection via the user input device 50 or display 52 of a user task descriptor displayed on the display 52 of the computing device 20. For example, the selection may be made by selecting one of the user task descriptors displayed in the task selection environment 360. Initiating a user task corresponds to beginning of the generating of a content item defined for the user task. Alternatively, a user task is initiated as soon as the information relating to the project is received from the data storage device 34 of the processing device 32. This may be the case for where the project is web-based.

According to various example embodiments, initiating the user task may include the initializing of a task environment at the computing device 20 of the given non-instructor user 14. This environment may be displayed on the display 52 of the computing device 20 used by the given non-instructor user 14. The environment may include a plurality of displayed elements which the non-instructor user 20 may interact with in order to carry out one or more tasks defined within the project. The project task environment may be implemented in hardware or software on the computing device 20 and/or the processing devices 32 of the educational service provider 30.

At step 156, operation of at least a first component of the content-generating computing device 20 being used by the given non-instructor user 14 is restricted. Restriction of the operation of this component may last for the duration of time that the content-generating computing device 20 is being used to generate the content item. For example, the restriction of the operation of this component may last for the duration that the user task is ongoing. The component of the content-generating computing device 20 being restricted at step 156 may refer to a hardware component of the content-generating computing device 20 or a software functionality of the content-generating computing device 20.

According to various example embodiments, the component being restricted corresponds to any hardware or software component of the content-generating computing device 20 that allows for access within the project task environment to pre-existing content items stored on the content-generating computing device 20, such as in data storage device 48, or to content items stored outside of the content-generating computing device 20. Content items stored outside the content-generating computing device 20 refers to content items that is not stored within any physical storage device found within the content-generating computing device 20. For example, the externally stored content items may be stored on an external drive, such as an external flash drive or an external hard drive, or may be stored on a storage device accessible over the network 28, such as content items that may be downloaded from the Internet or accessed in the cloud.

It will be appreciated that restricting the operation of the at least first component of the content-generating computing device 20 prevents the non-instructor user 14 from using the content-generating computing device 20 to access and therefore submit any pre-created content items and/or externally created content items within the carrying out of the user task.

At step 160, at least a second component of the computing device 20 is operated to generate a new content item. That is, while operation of the at least first component of the computing device 20 is being restricted, at least the second component of the computing device 20 remains operable. The at least second component is operated in response to one or more user inputs for interacting with the computing device 20. It will be further appreciated that since the at least second component of the computing device 20 is operated only in response to one or more user inputs and while operation of the at least first component of the computing device 20 is restricted, the new content item generated from operation of the at least second component is content item that is generated due to positive actions taken by the user and within the context of carrying out the user task. While component is operated at step 160 may be based on the type of the to-be-generated content item.

According to one example embodiment, the user task may indicate that a content item of the type still image is to be generated by the non-instructor user 14 using the content-generating computing device 20. Accordingly, at step 156, access to the data storage device 48 of the content-generating computing device 20 being used by the user 14 is temporarily restricted so that the user 14 cannot access a database of images stored on the data stored device 48, these images having been taken prior to initiating the user task. At step 156, communication of the computing device 20 with an external device, such as via the data port 56 or using the communication subsystem 38, may also be restricted so as to restrict downloading of a pre-generated content item to the computing device 20. While operation of the at least first component of the computing device 20 is being restricted, operation of at least the second component of the computing device 20 is permitted. In the example where the to-be-generated content item is of the type still image, the second component of the computing device 20 includes a camera unit 62 of the computing device 20. At step 160, in response from a user input, the camera unit 62 is operated to take a picture (e.g. capture the light incident on the camera sensor of the camera unit 62).

According to another example embodiment, the user task may indicate that a content item of the type sound is to be generated by the non-instructor user 14 using the content-generating computing device 20. Accordingly, at step 156, access to the data storage device 48 of the computing device 20 being used by the user 14 is temporarily restricted so that the user 14 cannot access the database of sound files archived or stored on the data storage device 48 that were recorded prior to initiating the user task. At step 156, communication of the computing device 20 with an external device, such as via a data port 56 or using the communication subsystem 38, may also be restricted so as to restrict downloading of a pre-generated content item to the computing device 20. In the example where the to-be-generated content item is of the type sound, operation of at least the microphone unit 60 of the computing device 20 is permitted while operation of the at least one first component of the computing device 20 is being restricted. At step 160, in response from a user input, the microphone unit 60 is operated so as to record a sound.

According to another example embodiment, the user task may indicate that a content item of the type video is to be generated by the non-instructor user 14 using the content-generating computing device 20. Accordingly, at step 156, access to the data storage device 48 of the computing device 20 being used by the user 14 is temporarily restricted so that the user 14 cannot access the database of video files archived or stored on the data storage device 48 that were recorded prior to initiating the user task. At step 156, communication of the computing device 20 with an external device, such as via a data port 56 or using the communication subsystem 38, may also be restricted so as to restrict downloading of a pre-generated content item to the computing device 20. In the example where the to-be-generated content item is of the type video, operation of at least the microphone unit 60 and the camera unit 62 of the computing device 20 is permitted while operation of the at least one first component of the computing device 20 is being restricted. At step 160, in response from a user input, the microphone unit 60 and the camera unit 62 are operated so as to record a video.

According to another example embodiment, the user task may indicate that a content item of the type text is to be generated by the non-instructor user 14 using the content-generating computing device 20. Accordingly, at step 156, access to the data storage device 48 of the computing device 20 being used by the user 14 is temporarily restricted so that the user 14 cannot access the database of text files archived or stored on the data storage device 48 that were recorded prior to initiating the project task. At step 156, communication of the computing device 20 with an external device, such as via a data port 56 or using the communication subsystem 38, may also be restricted so as to restrict downloading of a pre-generated content item to the computing device 20. In the example where the to-be-generated content item is of the type text, operation of at least the user input device 50 is permitted while operation of the at least one first component of the computing device 20 is being restricted. At step 160, in response from a plurality of user inputs, textual data is generated.

According to another example embodiment, the user task may indicate that a content item of the type GPS data is to be generated by the non-instructor user 14 using the content-generating computing device 20. Accordingly, at step 156, access to the data storage device 48 of the computing device 20 being used by the user 14 is temporarily restricted so that the user 14 cannot access the database of GPS data archived or stored on the data storage device 48 that were recorded prior to initiating the project task. At step 156, communication of the computing device 20 with an external device, such as via a data port 56 or using the communication subsystem 38, may also be restricted so as to restrict downloading of a pre-generated content item to the computing device 20. In the example where the to-be-generated content item is of the type GPS, operation of at least the GPS unit 64 of the computing device 20 is permitted while operation of the at least one first component of the computing device 20 is being restricted. At step 160, the GPS unit 64 is being operated so as to take location measurements and generate GPS data.

According to another example embodiment, the user task may indicate that a content item of the type sketch is to be generated by the non-instructor user 14 using the content-generating computing device 20. Accordingly, at step 156, access to the data storage device 48 of the computing device 20 being used by the user 14 is temporarily restricted so that the user 14 cannot access the database of sketches archived or stored on the data storage device 48 that were created prior to initiating the project task. At step 156, communication of the computing device 20 with an external device, such as via a data port 56 or using the communication subsystem 38, may also be restricted so as to restrict downloading of a pre-generated content item to the computing device 20. In the example here the to-be-generated content item is of the type sketch, operation of at least the touch sensitive display 52 of the computing device 20 is permitted while operation of the at least one first component of the computing device 20 is being restricted. At step 160, a sketch data is generated as a user traces a sketch on the touch-sensitive display 52.

While examples have been presented with respect to the to-be-generated content item being of the type image, sound, video, text, drawing/sketch and GPS data, it will be appreciated that yet other types of content items may be generated using the content-generating computing device 20 wherein operation of at least first component of the computing device 20 is being restricted while operation of at least a second component of the computing device 20 is being permitted.

According to various exemplary embodiments, the method 140 may optionally allow for the regenerating of the content item generated at step 160. Accordingly, the content item generated at step 160 is treated as a provisional content item. Then, and as illustrated in FIG. 4, at step 164, the provisional content item generated at step 160 is played back for review by the non-instructor user 14 using the computing device 20. The user may be further prompted to indicate whether the provisional content item is acceptable or not. Accordingly, at step 164, it is determined whether the currently generated content item has been accepted or rejected.

If a provisional generated content item is rejected, the method 140 proceeds back to step 160 and another provisional content item is generated from operation of the at least second component of the computer device 20. It will be understood that where the method 140 returns to step 160 to generate another content item, operation the at least first component of the computing device 20 remains restricted.

If the provisional content item is accepted, the method 140 proceeds to step 168 to make available the provisional content item as the generated content item. It will be appreciated that making available at step 168 refers to the generated content item made available for review by an instructor user 12 associated to the project. For example, the generated content item may be immediately transmitted to the processing device 32 of the educational service provider 30 to ensure that processing device 32 receives the content item in a timely manner.

According to some embodiments, the generated content item may be temporarily stored prior to being made available. For example, a generated content item may be temporarily stored in the data storage device 48 of the computing device 20 being used by the non-instructor user 14 or in the data storage device 48 while being associated to the user 14 and being indicated as not yet made available. Temporarily stored generated content items may be played back for review by the non-instructor user 14. The user 14 can then decide at a later time to make the generated content item available for review or to generated another content item for review.

At step 172, the user task of generating a content item of the type indicated by the project task is completed. Completing the task includes ending the restriction imposed at step 156 on the operation of the at least first component of the computing device 20. That is, proper functioning of the at least first component is restored. Where a task environment is initiated on the computing device 20 at 148, the task environment may be terminated at step 172. The task selection task can then be presented again, wherein a status indicator for the recently complete task now indicates that the task is completed.

Figure 10:
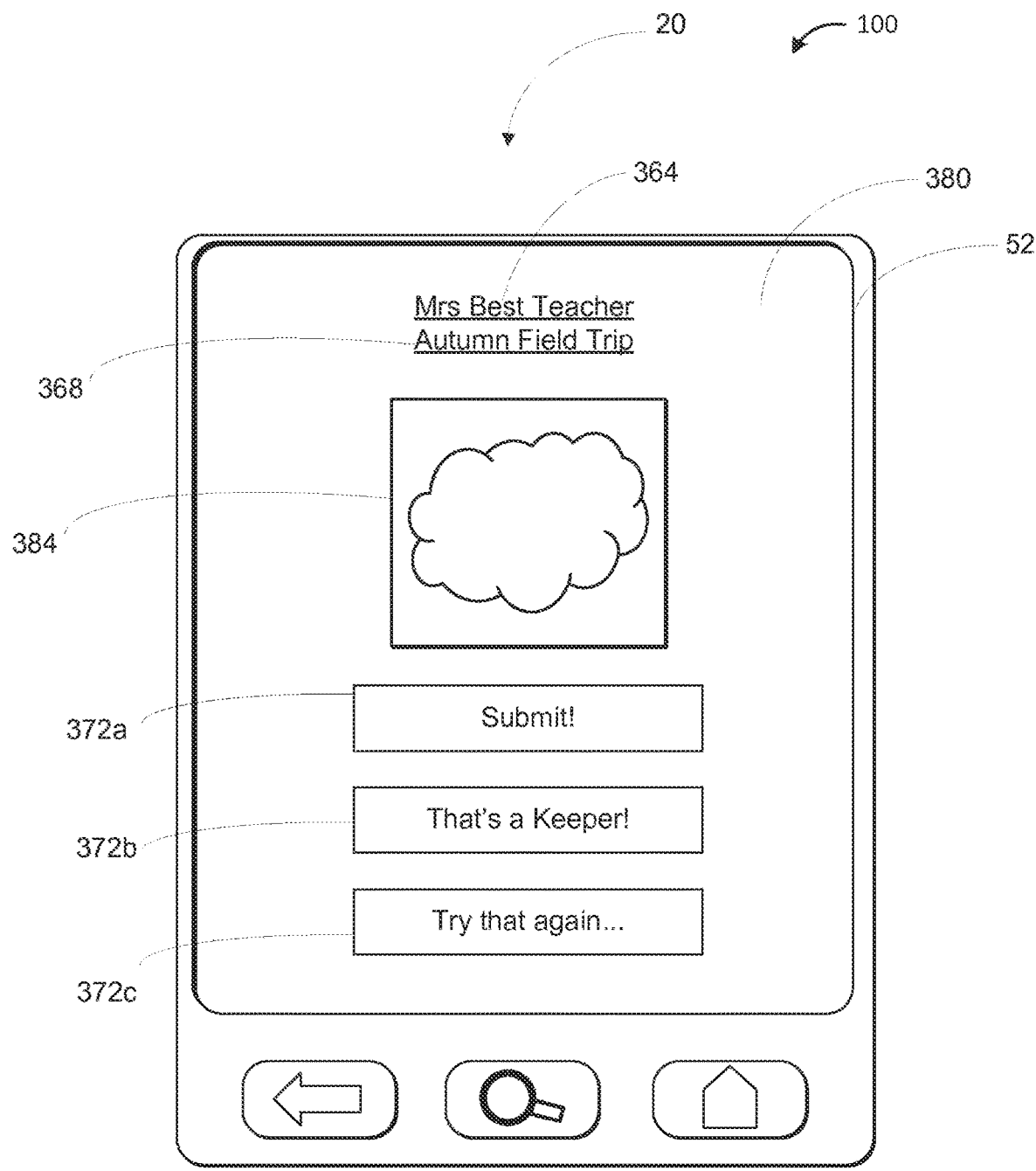
FIG. 10 is a block diagram illustrating an example task environment.

Referring now to FIG. 10, shown therein is a schematic diagram of an exemplary project task environment 380. The environment 380 includes a content item playback area 382 in which a provisional visual content item may be played back. The environment 380 further includes a first selectable area 384, which may be used to submit acceptance of the played back provisional content item. A second selectable area 386 may be used to temporarily store a provisional content item for later review. A third selectable area 388 may be used to reject a provisional content item.

Figure 5:
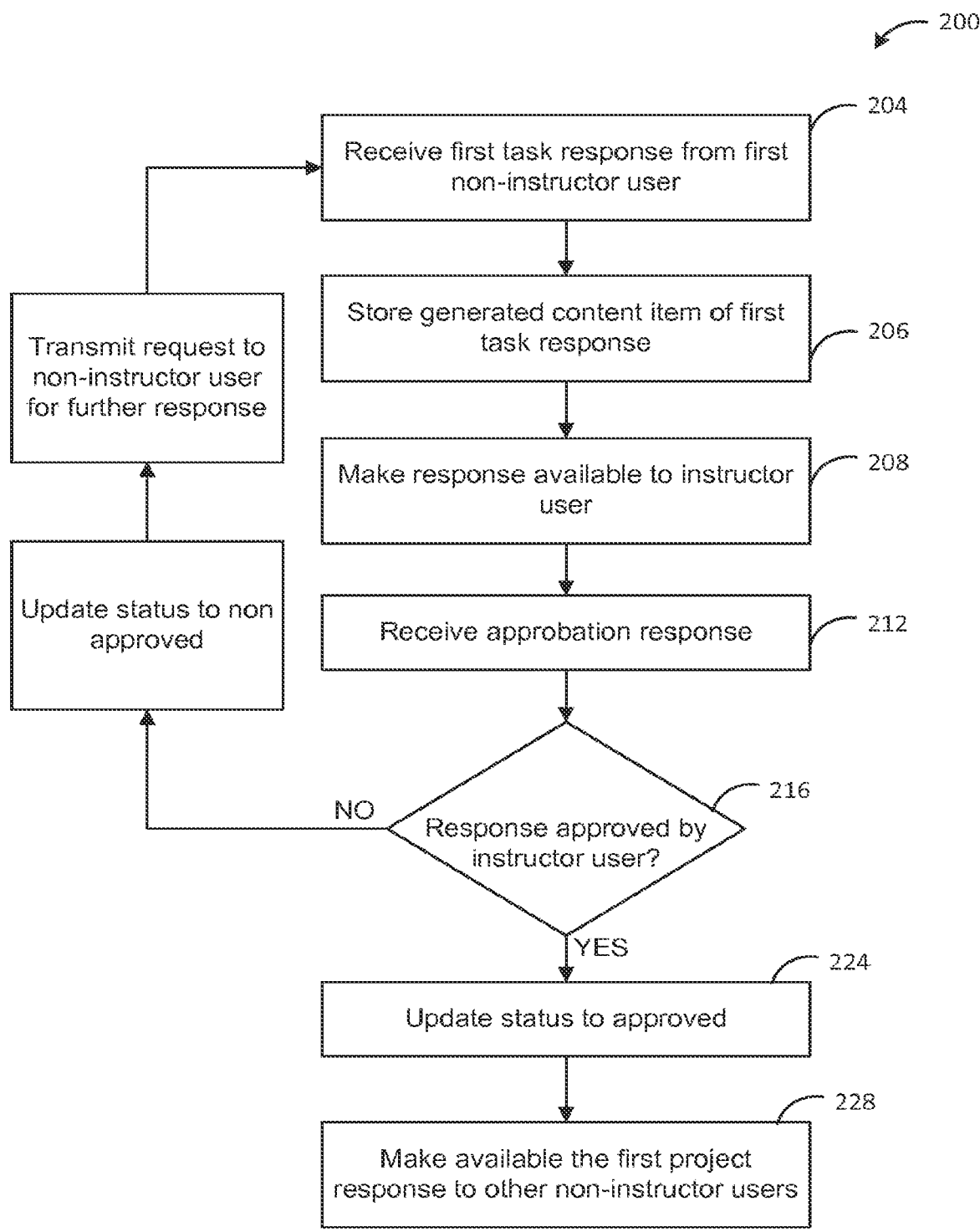
FIG. 5 is a flow chart diagram illustrating an example embodiment of a method for sharing generated content items amongst users of a same project.

Referring now to FIG. 5, shown therein is a flow chart diagram illustrating an example embodiment of a method 200 for sharing generated content items amongst 25 multiple users associated to a same project. The example method 500 may be carried out on the processing device 32 of the educational service provider 30.

At step 204, a first task response may be received from the content-generating computing device 20 that was used by a first non-instructor user 14. The first task response includes the content item generated from completion of a user task by a non-instructor user 14 (i.e. the carrying out of method 140 at the content-generating computing device 20). The first task response may also include other information related to the project task, such as information identifying the completed task, the identifier of the user 14 that completed task, and/or information identifying the project.

At step 206, the generated content item included in the first user response at received step 204 is stored. For example, a data entry 332 is created for the content item included in the first user response and is associated to the corresponding user task data entry 326a, 326b, 326c, 326d. For example, the generated content item data entry 332a, 332b, 332c, and 332d may be stored in the data storage device 34 of the education service provider 30. An approbation status data entry 336a, 336b, 336c, 336d may also be created and associated to generated content item data entry 332, wherein the status is set to "awaiting approval".

At step 208, the first task response is made available to the instructor user 12 associated to the project identified in the project identifier received in the project response. According to some example embodiments, the first task response is transmitted to the computing device 20 used by the instructor user 12. Alternatively, or additionally, the first task response is made available for the instructor user 12 that logs onto the educational service provider 30, whereby the instructor user 12 can then download the first task response.

At step 212, an approbation response is received from the instructor user 12 to which the first task response was made available at step 208. The approbation response indicates whether the first task response was approved or disapproved by the instructor user 12.

Figure 6:
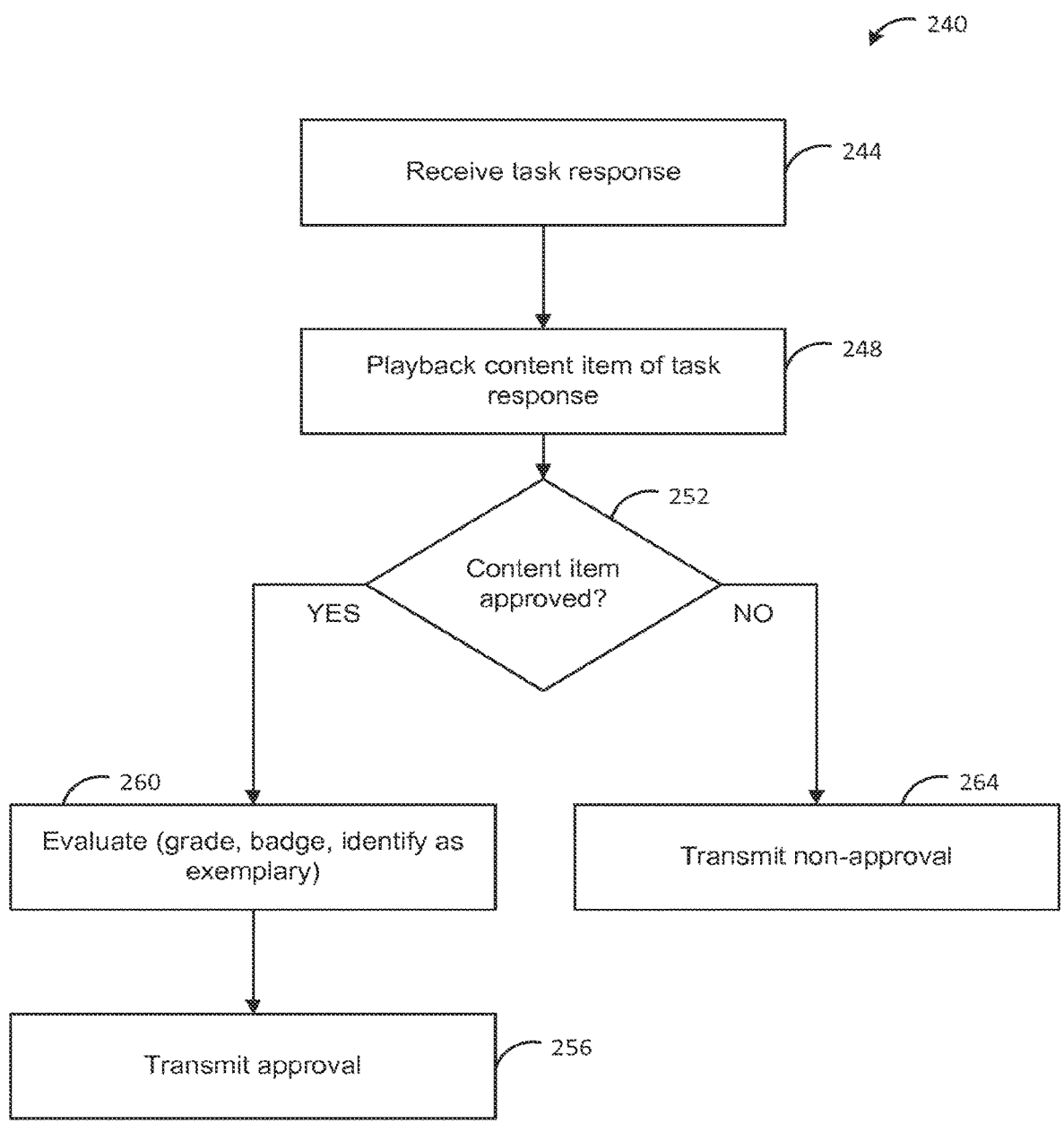
FIG. 6 is a flow chart diagram illustrating an example embodiment of a method for approval of a task response.

Referring now to FIG. 6, shown therein is a flow chart illustrating an example embodiment of a method 240 for approval of a task response. The method 240 may be performed by the processor 36 of a computing device 20 being used by an instructor user 12 or by the processing device 32 of the educational service provider 30. In some exemplary embodiments, steps of the method 240 may be split between the processor 36 of the computing device 20 and the processing device 32 of the educational service provider 30.

At step 244, a generated content item included in a task response is received. The generated content item can be one that was included in a first task response received at step 204 and subsequently made available to the instructor user 12 at step 208. For example, method 140 is carried out by a computing device 20 being used by a non-instructor user 14 to complete a user task. The generated content item made available at 168 is subsequently received as part of a task response at the processing device 32 of the educational service provider 30 at step 204 of the 200. The task response subsequently made available by the processing device 32 at step 208 is then received at another computing device 20 being used by the instructor user 14 at step 244.

At step 248, the generated content item included in the task response received at step 244 is played back. The generated content item may be played back on the computing device 20 being used by the instructor user 12. Playing back the generated content item allows the instructor user 12 to review the generated content item. The instructor user 12 may be further prompted to indicate whether the generated content item is approved or not approved. The instructor user 12 may approve or not approve the generated content item by interacting with the computing device 20, such as entering an input using the user input device 50 or display 52.

According to various exemplary embodiments, approbation of the generated content item subsequently determines whether the generated content item can be entered as an appropriate response for the ongoing project.

In one exemplary embodiment, the instructor user 12 may specify that content items matching a specific description should be generated. Where a generated content item received at step 244 is not relevant to that description, the instructor user 12 can choose to not approve the generated content item.

In various exemplary embodiments, generated content item played back at step 248 may be reviewed by the instructor user to filter out inappropriate generated content items. For example, the instructor user 12 can choose to not approve any generated content item that may be considered offensive, not age-appropriate or confidential.

At step 252, the approbation response is received and it is determined whether the generated content item received at step 244 was approved or not approved.

If the generated content item is approved, the method proceeds to step 256 to transmit the "approved" response to the processing device 32 of the educational service provider 30.

According to various exemplary embodiments, if the generated content item is approved, the method may also include prompting and receiving at step 260 an evaluation of the generated content item. For example, an evaluation environment may be displayed on the display 52 of the computing device 20 being used by the instructor user 12 to provide an evaluation. The evaluation may be one or more of a grade (e.g. number score, or letter grade A, B, C, F, etc. . . . ), an achievement badge or textual feedback.

If the generated content item is not approved, the method proceeds to step 264 to transmit the "not approved" response to the processing device 32 of the educational service provider 30.

Referring back to FIG. 5, at step 216, it is determined whether the approbation response indicates that the generated content item of the task response received at step 204 was approved or not approved. If the generated content item was not approved, the method 200 proceeds to step 220 to transmit to the non-instructor user 12 a request for a further task response for the user task.

If the first project response is approved, the method proceeds to step 224. At step 224, the approbation status 336a, 336n, 336c, 336d for the generated content item data entry 332a, 332b, 332c, 332d is updated. If a generated content item is indicated as being approved within the approbation response, the status indicator associated to that content item is updated to "approved". If at least one content item is indicated as being non-approved within the approbation response, the status indicator associated that content items updated to "non-approved".

Optionally, at step 228, the content items that were indicated as being approved within the approbation response received at 212 are made available to other non-instructor users 14 that are participants to the current project. Accordingly, other non-instructor users 14 can access (e.g. download and playback) the at least one content item generated by the first non-instructor user 14 and included in the first project response received at step 204. As a result, the at least one content item generated by the first non-instructor user 14 is shared amongst other users.

It will be appreciated that where multiple non-instructor users 14 are participants to a project and a plurality of the users 14 generate content items that eventually become approved, a pool of a plurality of approved generated content items 332a, 332b, 332d will be accessible to each of the non-instructor users 14. Moreover, where the project is set-up so that content items that correspond to a particular descriptor are generated, the plurality of generated content items will include a subset of content items that correspond to that descriptor.

Advantageously, the making available of a plurality of generated content items may enhance the learning experience for non-instructor users 14 participating in the project. A non-instructor user 14 may easily access the work (i.e. generated content items) of non-instructor users 14. For example, the non-instructor users 14 can then compare the work of other users against his or her own work. For example, being able to access multiple examples of one subject captured in generated content items can provide the user 14 with a better understanding of the subject.

Referring again to FIG. 8, the example illustrated therein shows four non-instructor user data entries 324a, 324b, 324c, and 324d. Each non-instructor user data entry 324a,

324b, 324c, and 324d further include an associated user task data entry 326a, 326b, 326c, 326d indicating a project task assigned to that user 14.

Furthermore, a first user having the identifier of first user identifier data entry 324a, a third user having the identifier of the third user identifier data entry 324c, and fourth user having the identifier of fourth user identifier data entry 324d have each been assigned project task 2. These users have also completed their respective user task by generating least one content item. The second user having the identifier of the second user identifier data entry 324b has been assigned project task 1, which has yet to be completed.

Furthermore, a first status data entry 332a associated to the generated content item 332a associated to the first user identifier data entry 324a indicates a status "approved" to represent that the content item 332a has been reviewed and approved by an instructor user 12. For example, the status "approved" may further indicate that the content item 332a can be made available to other non-instructor users 14 participating in the project.

The second user identified by second user identifier data entry 324b has yet 5 to submit a project response with a generated content item. Therefore, no generated content item data entry is associated to this user.

A status data entry 332b associated to the content item 328b associated to the third user identifier data entry 324c indicates a status "awaiting approval" to represent that the content item 328b has not yet been reviewed by an instructor user 12. For example, this content item may be presented in a list to the instructor user 12 to prompt the user 12 to review and provide approbation of the content item 328b.

Two content items 328c, 328d are associated to the user task data entry 326d of the fourth user identifier 324d. The status data entry 332c associated to a content item 328c indicates a status "not approved" to represent that the content item included in a first task response from the user was reviewed by an instructor user 12 and was not approved by that user. Subsequently, the user was requested to provide another generated content item to complete the task, which resulted in the content item 328d being submitted. This second content item 328d was also reviewed by the instructor user 12 and was approved, thereby resulting the "approved" status 332d being associated to the second content item 328d. For example, the status "approved" may further indicate the content item 328d can be made available to other non-instructor users 12 participating in the project.

Referring now to FIG. 7, therein illustrated is a flow chart diagram illustrating an example embodiment of a method 500 for making available generated content from a project that is external to a current project. The example method 500 may be carried out on the processing device 32 of the educational service provider 30.

The term "current project" herein refers to a project in which non-instructor users 14 participating in the project generate content items to complete user tasks assigned to the users 14.

The term "external project" herein refers to a project other than the current project. In particular, the external project may include non-instructor users 14 that are not participating in the current project. For example, the non-instructor users 14 of the external project may be users in another educational group 16 or sub-group 18, such as another classroom. The non-instructor users 14 may also be users from another educational institution, entity that provides educational services or an independent service provider. In some cases, the non-instructor users 14 of the external project may be located at a remote location from the non-instructor users 14 of the current project. The external project may be a project that was previously completed or one that is ongoing.

Continuing with FIG. 7, at step 504, a related external project is identified. Identifying the related external project may include identifying an external project that includes at least one project task data entry (312a, 312b) that indicates a content type 316 and descriptor 320 that matches the content type 316 and descriptor 320 indicated by a content item data entry of the current project. Accordingly, the identified external project will include generated content item entries that are related to and/or relevant to generated content item of the current project.

Identifying the related external project may include searching through data entries of archived projects stored on the data storage device 34 of the educational service provider 30. Identifying the related external project may also include accessing a database of external projects. For example, the database may include data entries indicating content type and descriptor for external projects that were carried out or that are currently being carried out at another educational institution, another entity that provides educational services or an independent service provider. In some example embodiments, the database of external project may include indexed data entries indicating content type and descriptor for easy identification of related external projects.

At step 508, at least one generated content item of the related external project identified at step 504 is made available to at least one non-instructor user 14 of the current project. In some example embodiments, generated content items having a type and descriptor of the related external project that match the type and descriptor of a content item data entry of the current project are made available.

Making available generated content items of the related external project may include copying that generated content item to the data storage device 34 of the educational service provider hosting the current project.

Alternatively, a link to the generated content item of the related external project may be associated to one or more non-instructor user data entries 324a, 324b, 324c and 324d.

It will be appreciated that making available generated content items of an external task project allows a non-instructor user 14 of the current project to play back those generated content items. Playing back this generated content item may also enhance the learning experience of non-instructor users 14. For example, a non-instructor user 14 may be able to compare his or her own generated content items with that of users in other projects. Additionally, the non-instructor user 14 may be to view how the subject matter of a generated content item may be different when being captured by users in another geographical area. For example, a non-instructor user 14 may compare images of food, fauna, flora, art, weather, architecture, etc. of his or her own geographical location with generated content item from a related external project conducted in another geographical location showing differences in food, fauna, flora, art, weather, architecture, etc.

Additionally, making available generated content items from an external project ensures that the generated content items are made available to the non-instructor users in a controlled and filtered manner. For example, by making available only the generated content items from the external project that have an "approved" status, the content items are made available will all have undergone an approbation step, such as step 252 of method 240, thereby reducing the possibility that irrelevant or inappropriate generated content items are made available to the users.

According to various exemplary embodiments described herein, the making available of various responses within a project may be delayed for a predetermined duration of time.

In some exemplary embodiments, the making available of a generated content item at step 168 may be delayed by a predetermined duration of time after generating the content item at step 164 of method 140.

In some exemplary embodiments, the making available of the generated content item at step 208 may be delayed by a predetermined duration of time after receiving and storing a task response at step 204 and 06 of method 200.

In some exemplary embodiments, the making available of the first project 5 response to other non-instructor users a step 228 may be delayed for a predetermined duration of time after receiving an approbation response for an instructor user 12 at step 216 of method 200.

In some exemplary embodiments, the transmitting of an evaluation provided by an instructor user at step 260 may also be delayed for a predetermined duration of time after the evaluation is provided at step 260.

Delaying the making available of various responses from an instructor user 12 or a non-instructor user 14 may be useful to ensure anonymity of users within the project. For example, in a setting where a plurality of non-instructor users 14 are present and can see each other's interaction with a computing device, instantly making available response (especially in a push transmission) allows users to identify a particular response with a non-instructor user 14.

By way of example, where no delay is applied, users may see one given non-instructor user 14 interact with his or her computing device 20 and immediately see the instructor user 12 receiving a response at the instructor's computing device. In such an instance, it can be deduced that the response received by the instructor was transmitted by the given non-instructor user 14.

Similarly, users may see an instructor user 12 interact with his or her computing device 20 and immediately see a given non-instructor user 14 receiving a response at that user's device. In such an instance, it can be deduced that the instructor was communicating with that non-instructor user 14.

By contrast, where a delay is applied before the making available or transmission of a response, a plurality of users may be interacting with their respective computing devices 20 or a plurality of users may be receiving response. Accordingly, it becomes more difficult to deduce which non-instructor user 14 communicated with an instructor user 12.

Figure 11:
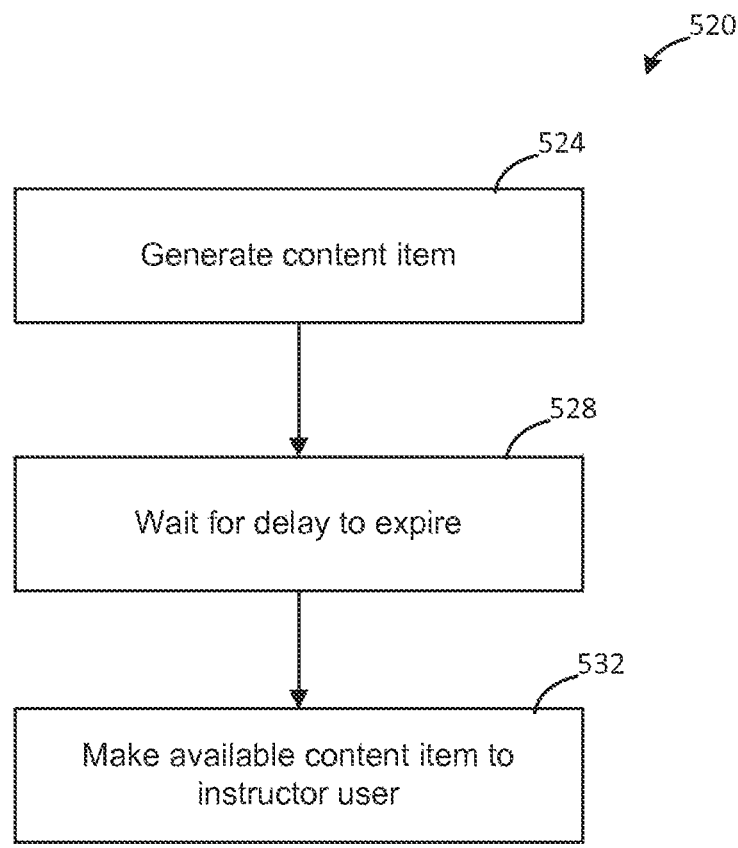
FIG. 11 is a flow chart diagram illustrated an example embodiment of a method for interacting with an instructor user.

Referring now to FIG. 11, shown therein is a flowchart of an example method 520 for interacting with an instructor user 12. The method 520 may be performed by the processor 36 of a computing device 20 being used by a non-instructor user 12. In some exemplary embodiments, steps of the method 240 may be split between the processor 36 of the computing device 20 and the processing device 32 of the educational service provider 30.

At step 524, a content item is generated by a user using a content-generating computing device 20.

At step 528, the delay of the predetermined duration is allowed to expire.

At step 532, after the expiration of the delay of the predetermined duration, the generated content item is made available to the instructor user.

Figure 12:
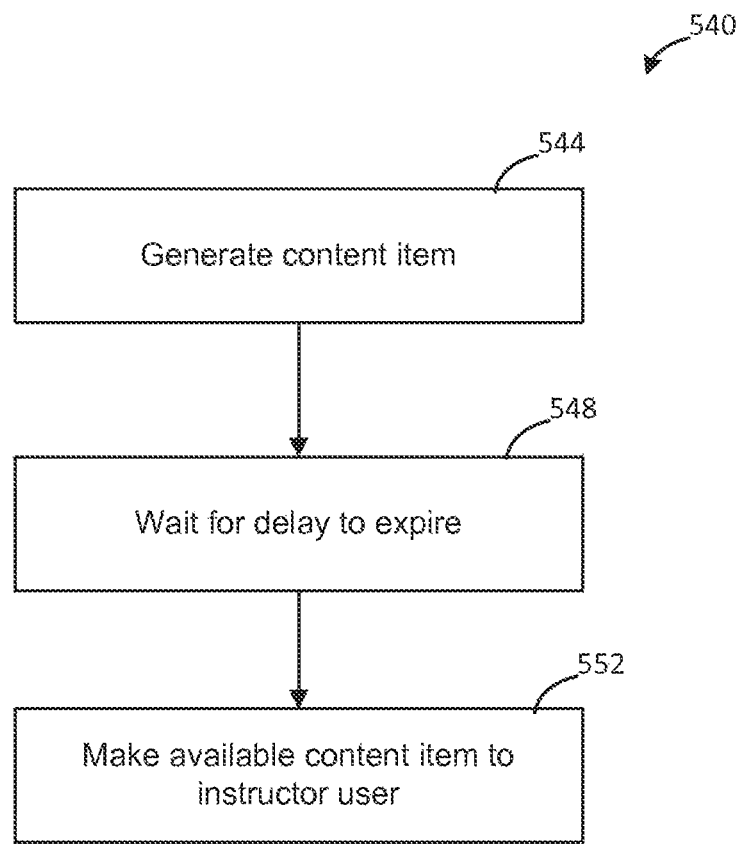
FIG. 12 is a flow chart diagram illustrating an example embodiment of a method for interacting with a non-instructor user.

Referring now to FIG. 12, shown therein is a flowchart of a method 540 for interacting with a non-instructor user 14. The method 540 may be performed by the processor 36 of a computing device 20 being used by an instructor user 12. In some exemplary embodiments, steps of the method 240 may be split between the processor 36 of the computing device 20 and the processing device 32 of the educational service provider 30.

At step 544, a content item is generated by a user using a content-generating computing device 20.

At step 548, the delay of the predetermined duration is allowed to expire.

At step 552, after the expiration of the delay of the predetermined duration, the generated content item is made available to the non-instructor user 14.

The use of a delay before transmission may be useful to engage shy students who do not like to speak up in class. Those students could submit an answer using a computing device 20 to the instructor, which can be received by the instructor. The instructor can then response using another computing device 20. Applying the delay ensures that communication between a student and a instructor is not instantaneous, thereby making it more difficult to identify which student is interacting with the instructor.

Various exemplary embodiments described herein may be useful when teaching is being carried out outside of a classroom setting. For example, on field trip, non-instructor users 14 may use content-generating computing devices 20 to capture things experienced during the field trip.

Figure 13:
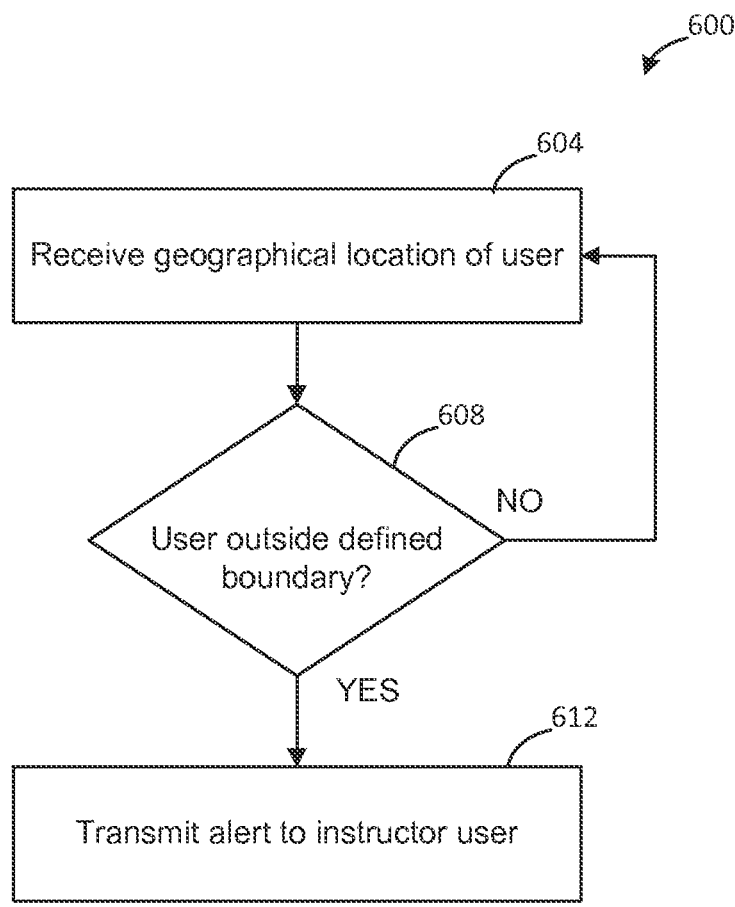
FIG. 13 is a flow chart diagram illustrating an example embodiment of a method for monitoring location of one user.

According to one exemplary embodiment, an ongoing project may further include monitoring the location of users. Referring now to FIG. 13, therein illustrated is a method 600 for monitoring location of one user. The method 540 may be performed by the processor 36 of a computing device 20 being used by an instructor user 12. In some exemplary embodiments, steps of the method 240 may be split between the processor 36 10 of the computing device 20 and the processing device 32 of the educational service provider 30.

At step 604, the current geographical location one user is received. For example, the user may be a non-instructor user 14. The location of the user may be indicated by a positioning device, such as GPS module 64 of a content-generating computing device 20 being carried on that user.

At step 608, it is determined whether the geographical location received at step 604 is outside of a predetermined boundary. The predetermined boundary may define a geographical area representing a zone that is safe or allowed for non-instructor users 14 of the current project.

If the current geographical location received at step 604 is within the predetermined boundary, the method 600 returns to step 604 to receive another geographical location of the user.

If the current geographical location received at step 604 is outside the predetermined boundary, the method proceeds to step 612 to transmit an alert to the instructor user. Being outside the boundary represents to a situation where a user has moved outside of the safe or allowed zone. For example, it may represent a student who has wandered too far during a field trip.

It should be understood that various modifications can be made to the embodiments described and illustrated herein, without departing from the embodiments, the general scope of which is defined in the appended claims.

The invention claimed is:

1. A method for completing a project using a content-generating device, the method comprising:
receiving a task defining a content item to be generated, wherein the task is defined by a first user;
restricting operation of at least a first component of the content-generating device;

receiving the content item, wherein the content item was generated in connection with a second user's use of at least a second component of the content-generating device; and holding the first generated content item for a predetermined period of time to anonymize the second user with respect to the first user;

making the generated content item available, after having held the first generated content item for the predetermined period of time.

2. The method of claim 1, wherein the at least first component is operable to access pre-existing content items and wherein restricting operation of the at least first component prevents data access to the prior content.

3. The method of claim 1, wherein restricting operation of the least first component of the content-generation device is ended after making available the generated content item.

4. The method of claim 1, wherein receiving the task for generating the content item comprises receiving a type of the content item to be generated; and wherein the at least second component of the content generated is chosen based on the type of the content item to be generated.

5. The method of claim 1, wherein the type is chosen from one of text, sound, video, and still image.

6. The method of claim 1, further comprising:
in response to generating a first provisional content item, prompting for acceptance of the generated first content item;
receiving a response indicating acceptance of the first content item or non-acceptance of the first provisional content item;
in response to receiving the non-acceptance response of the first provisional content item, operating the at least second component to generate a second content item; and
wherein the first provisional content item is made available as the generated content item to the project management server, in response to receiving the response indicating acceptance.

7. A method for sharing of content items generated within a current project, the method comprising:
receiving a first response from a first non-instructor user, the response having a project identifier and a first generated content item and being identified as being ready to be made available to an instructor user, the first non-instructor user being associated to the project identifier, wherein the first generated content item was generated in connection with use of a first component of a content-generating device at a time when operation of a second component of the content-generating device was restricted;
holding the first generated content item for a predetermined period of time to anonymize the first non-instructor user with respect to the instructor user;

making available the first generated content item to the instructor user associated to the project identifier, after having held the first generated content item for the predetermined period of time;
receiving from the instructor user a first approbation response indicating approval or non-approval of the first content item;
in response to receiving the first approbation response indicating approval of the first content item, making available the first generated content item to at least a second non-instructor user associated to the project identifier.

8. The method of claim 7, further comprising:
receiving from the instructor user evaluation data for the generated content item; and
making available the evaluation to the first non-instructor user.

9. The method of claim 7, further comprising:
in response to receiving the first approbation response indicating non-approval of the first content item, transmitting to the first non-instructor user a project completion request for generating at least one additional content item.

10. The method of claim 7, further comprising:
receiving a second response from the second non-instructor user associated to the project identifier, the response having the project identifier and a second content item;
making available the received second content item to the instructor user associated to the project identifier;
receiving from the instructor user a second approbation response indicating approval or non-approval of the second content item;
in response to receiving the second approbation response indicating approval of the second content item, making available the second content item to at least the first non-instructor user associated to the project identifier.

11. The method of claim 7, further comprising:
searching for at least one external project relevant to the current project;
making available to at least one of the first non-instructor user and the second non-instructor user at least one content item generated for the at least one external project.

12. The method of claim 7, making available the first content item to the instructor user associated to the project identifier comprises transmitting the received content item to the instructor user, wherein the transmitting of the content item is delayed by a predetermined duration of time after receiving the first content item.

13. The method of claim 7, wherein the given type associated to the project identifier is chosen from one of text, sound, video, and still image.

* * * * *